May 8, 1934.  E. B. WILFORD  1,957,813
AIRCRAFT
Original Filed Feb. 20, 1931   2 Sheets-Sheet 1

INVENTOR.
EDWARD BURKE WILFORD.
BY Frank H. Borden
ATTORNEY.

May 8, 1934.    E. B. WILFORD    1,957,813
AIRCRAFT
Original Filed Feb. 20, 1931    2 Sheets-Sheet 2
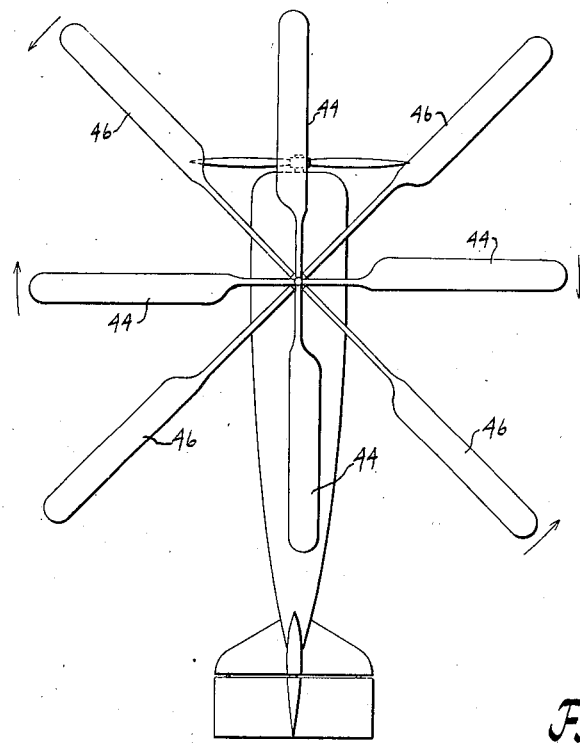
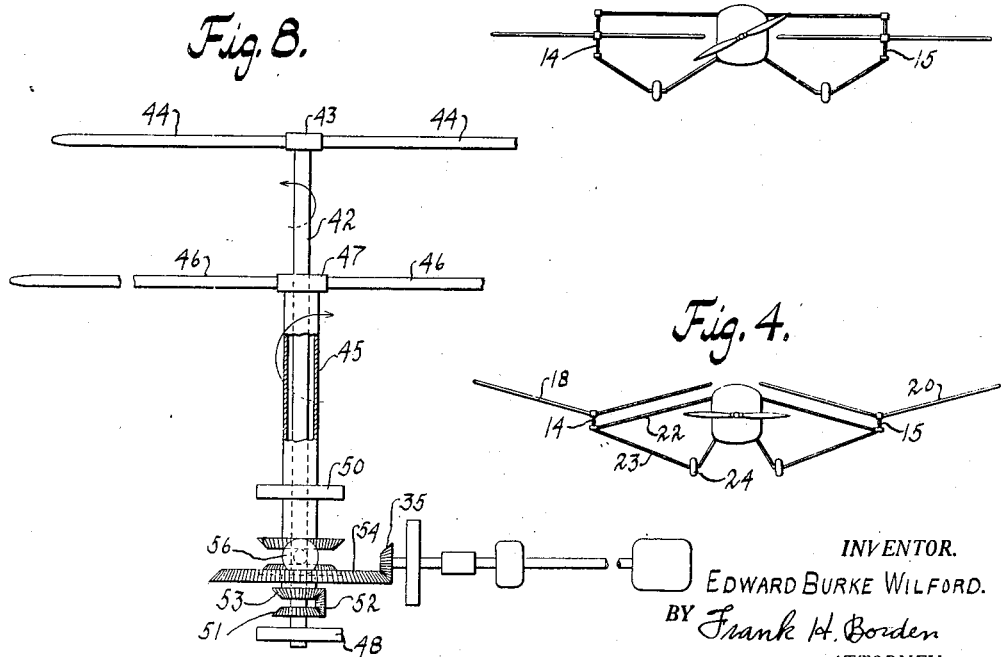
INVENTOR.
EDWARD BURKE WILFORD.
BY Frank H. Borden
ATTORNEY.

Patented May 8, 1934

1,957,813

UNITED STATES PATENT OFFICE 1,957,813

AIRCRAFT

Edward Burke Wilford, Merion, Pa.

Application February 20, 1931, Serial No. 517,227
Renewed September 16, 1933

1 Claim. (Cl. 244—19)

This invention relates to aircraft of the rotating wing system type.

In aircraft of the gyroplane or helicopter type it is known that with fixed wings or blades on the rotor, a rolling moment is generated incident to the excess of lift on those blades going into the airstream over that developed by those travelling with the airstream in the aerodynamic gyration. This factor has precluded the use of such fixed blades from consideration as sustaining devices in rotating wing systems previous to this invention.

The term "gyroplane" or "rotating wing system" is intended to be broad enough as used herein to cover and include power driven rotating wing systems, such as helicopters, as well as the aerodynamically reacting rotating wing systems.

It is among the objects of this invention; to provide a pair of rotating elements of the gyroplane or helicopter type on each side of the longitudinal axis of the aircraft in such a manner that the rolling moment generated by one rotor is neutralized or equalized by the opposite rolling moment of the other rotor so as to maintain stable equilibrium; to reduce the span necessary to support a pair of rotors or rotating wing systems by overlapping the paths of rotation of a pair of the rotors; to provide a pair of rotors or rotating wing systems in geared relation; and many other objects and advantages as will become more apparent as the description proceeds.

Figure 1:
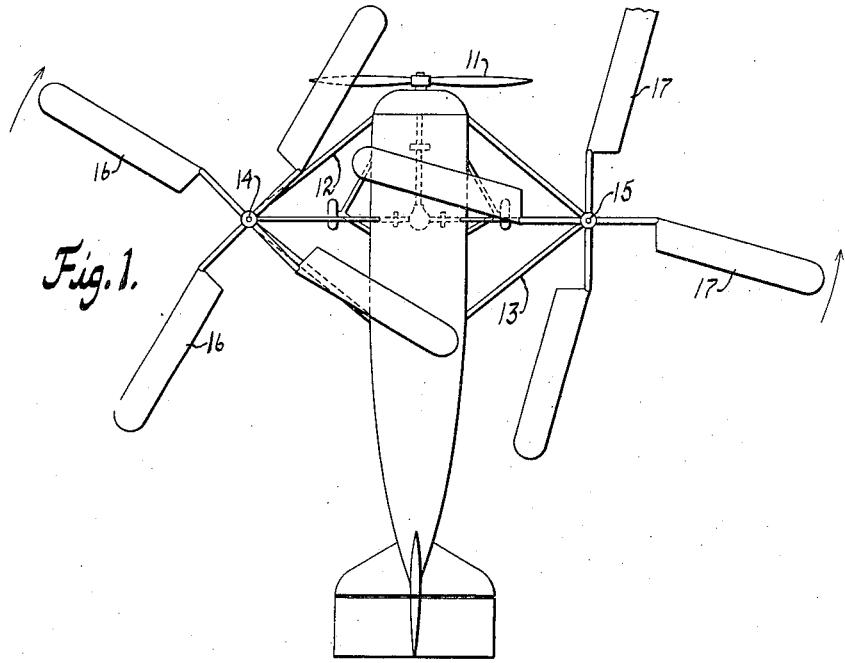
Fig. 1 represents a plan of one form of the invention.
Figure 2:
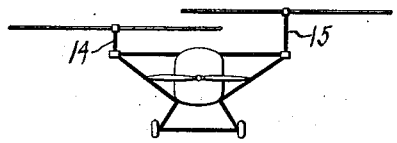
Fig. 2 represents a diagrammatic front elevation of the device of Fig. 1.
Figure 3:
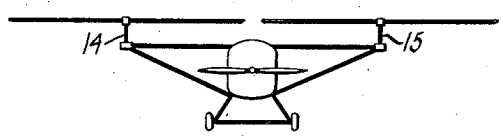
Figure 6:
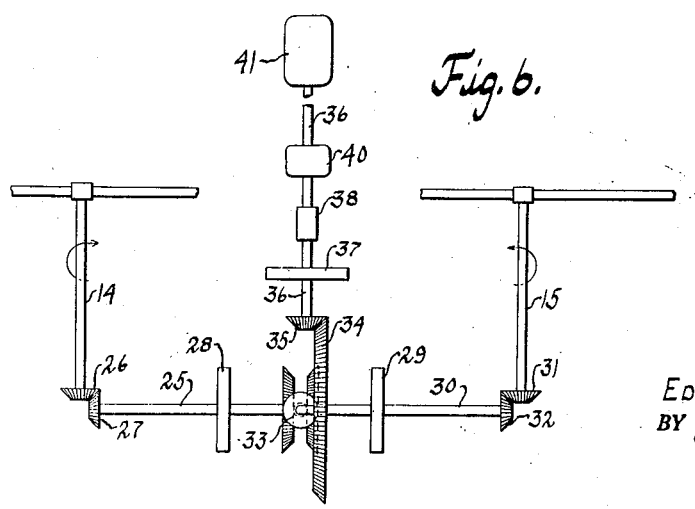

Fig. 3 represents a diagrammatic front elevation of a slightly modified form of the invention disclosed in Fig. 1, Fig. 4 represents a diagrammatic front elevation of a further modified form of the invention broadly illustrated in Fig. 1, Fig. 4 represents a diagrammatic front elevation of a further modified form of the invention broadly illustrated in Fig. 1, Fig. 6 represents a diagrammatic view of the power drive and gearing arrangements coupling the opposite rotating wing systems of Figs. 1, 2, 3, 4, and 5, Fig. 7 represents a plan of a further modified form of gyroplane including two oppositely turning rotating wing systems, and Fig. 8 represents a diagrammatic elevation partially in section of a power drive and gearing for the form of the invention in Fig. 7.

Referring to Fig. 1, the fuselage having a propeller 11 is provided with a lateral trussing 12 on one side of the fuselage and with a similar trussing 13 on the other side thereof. Trussings 12 and 13 form bearings for vertical shafts respectively 14 and 15, which form the axes of the respective rotors. The shaft 14 carries a plurality of blades 16 which may be rigid and possessed of no movement relative to the axis 14 or to the horizontal but they may also, if desired, and on the contrary, be hinged or otherwise mounted for such movement as may be desired. Rotor shaft 15 carries blades 17 of the same characteristics as blades 16 on rotor shaft 14.

As shown in Figs. 1 and 2, rotor shafts 14 and 15 may be of different vertical lengths, so that the paths of rotation of the respective rotating wing systems will be in different horizontal planes. As shown in those figures the lateral span between the rotor shafts is such as to cause overlapping of the peripheral paths of the systems, but which makes but small difference in the effectiveness of the systems as with the systems so geared or so disposed as to turn oppositely, that is with the wing system of rotor shaft 14 turning clockwise, and with the wing system of rotor shaft 15 turning counterclockwise, the overlapping paths of the blades occur at that sector of each system which is least efficient. This is owing to the fact that the blades moving toward the rear with the airstream, have the least degree of lift, while the outer sectors moving toward the airstream, or against the airstream, have the greatest lift. The lifting effect is therefore greatest as a rolling moment on each rotor shaft urging the roll toward the fuselage. As the rolling moment on the rotor shafts is carried into the framework of the gyroplane and as they are equal and opposite the rolling moments are cancelled, and the gyroplane is therefore inherently stable.

In the form of the invention disclosed in Fig. 3, the span of the gyroplane is greater, and the rotor shafts 14 and 15 are of the same vertical extent so that the pair of rotating wing systems lie in the same plane.

An important feature is embodied in the disclosure of Fig. 4 and Fig. 5. Recognizing the limitations on maneuverability of the conventional gyroplane, owing to the "parasol" effect, that is, owing to the disposition of the center of gravity of the gyroplane well below the center of support thereof, and recognizing also the reduced visibility of the conventional gyroplane rendering its use for military purposes impossible, the form of invention disclosed in these figures is particularly well adapted for military uses.

The rotor shafts 14 and 15 carry rotating wing systems 18 and 20, which may have a conical formation as shown in Fig. 4, to effect a dihedral which contributes to the stability and strength of the supporting system, or, as shown in Fig. 5, may be substantially in a plane. The hubs of systems 18 and 20 are disposed below the upper level of the fuselage 21, so that they lie in a plane containing the center of gravity of the whole. The center of gravity may be variant from this plane, but should be close enough thereto to facilitate acrobatics and ease of maneuverability. To this end a supporting framework extends laterally of the fuselage on each side, comprised of a strut 22 extending from the fuselage, connected in a bearing support for the rotor shaft 14, with a landing gear strut 23, carrying the landing gear wheel or assembly 24 (Fig. 4). A transverse brace, (not shown) may connect the landing gear wheels to form a truss construction for the assembly. It will be observed that the top of the fuselage is clear of the rotating wing systems, with an enhancement of visibility, while the disposition of the centers of lift on each side of the longitudinal axis of the gyroplane in substantial horizontal alignment with the center of gravity of the whole imparts maneuverability to the gyroplane which has heretofore been lacking. In Fig. 5 the strut 22 extends above the rotor, and the rotor is in a substantial plane.

In any of the forms of the invention disclosed in Figs. 1, 2, 3, 4 or 5, the rotating wing systems may be mounted for free rotation independent of one another if desired, and be driven independently by aerodynamic reaction alone.

However effective such independent disposition may be it is contemplated that the rotors or rotating wing systems may be geared for synchronous action. In such event it is preferred that the gearing for synchronous actuation be coupled with a differential effect, with braking systems such that the slowing down of one wing system will cause an acceleration of the other whereby rolling moments of the gyroplane may be developed for purposes of control.

Referring now to Fig. 6 rotor shaft 14 is in driven relation to a torque shaft 25, through cooperating bevel gears 26 and 27. Torque shaft 25 has a brake 28, of any desired construction, and it will be clear that application of brake 28 will retard or slow down the rotation of rotor shaft 14 and of the rotating wing system supported thereby. Clearly such retardation will reduce the effective lift of that system. Rotor shaft 15 is in driven relation to torque shaft 30, through bevel gears 31 and 32. Torque shaft 30 has a brake device 29 of the same characteristics as brake 28. Torque shafts 25 and 30 rotate in the same direction so that rotor shafts 14 and 15 turn in opposite directions as will be clear. A differential gear assembly 33 engages torque shafts 25 and 30 and normally determines that both shafts turn at the same rate of speed. The differential assembly includes a ring gear 34, and a pinion gear 35 is in mesh therewith, and mounted on shaft 36. Shaft 36 has an overrunning clutch 37, a centrifugal clutch 38, and a pilot controlled clutch 40 (which preferably is a combined clutch and brake) alternately operative, a second brake (not shown) may be placed on shaft 36 to insure proper differential action, and is connected to a power source 41, which may well comprise the power source of the gyroplane which drives the propeller 11. Clearly it is not necessary that these several types of clutches all be installed, but the advantages of them will be evident. Thus in the initial rotation of the systems the pilot may energize the clutch 40 to start shaft 36. The centrifugal clutch being of the type which is effective only at slow speeds places the next section of shaft 36 in train to the overrunning clutch, which being engaged in the event of higher speed of shaft 36 than the torque shafts 25 and 30, transmits the drive to the torque shafts. As the speed of the power source increases the centrifugal clutch disengages when the speed of rotation of shafts 25 and 30 is proper and continued rotation is by aerodynamic reaction of the rotating wing systems mounted on the respective rotor shafts. If, in flight, the power source is throttled down, the overrunning clutch permits the free rotation of the shaft 36.

The operation of the devices disclosed in Figs. 1, 2, 3, 4 and 5 will be clear. It may be stated that in normal flight, the rolling moment of each rotating wing system cancels the other and stability is had. To generate a lateral rolling moment of the gyroplane about its longitudinal axis application of either brake 28 or 29 will retard the speed of the respective associated wing system, while simultaneously, through the differential gearing, increasing the speed of the other wing system. Decrease of the speed of one system decreases its lift and generates a rolling moment of itself. This is of importance in the event the differential gearing is not utilized. Increase of the speed of the other rotating system of course increases its lift and also magnifies the rolling moment. Coupling the two systems as in the illustrative form enhances or magnifies the rolling moment as will be clear and, of course, increases the speed of the stabilizing controlling action.

In the form of the invention disclosed in Figs. 7 and 8, the two rotating wing systems are supported for rotation about concentric axes, but with the plane of rotation of one system in vertically spaced relation to that of the other. Thus a shaft 42 forms the axis of rotation of the wing system 43 including the blades 44. The shaft 42 is suitably journalled for rotation within a larger concentric tubular shaft 45, which supports the several blades 46 comprising the rotating wing system 47. The lower rotating system may have the blades 46 at a greater angle of incidence relative to the plane of rotation, than blades 44 in the upper system, and thus permit the two systems to have circular paths of the same diameter, or with similar angles of incidence as in the illustrative disclosure, the lowermost system may have a greater diameter than the upper system. This arrangement of the two systems is to compensate for the loss of efficiency of the lower rotor as a result of the adverse action of the upper rotor in the aerodynamic reaction of the lower rotor as will be clear.

The shaft 42 may have a brake device 48, for retarding the speed of rotation of the system 43, and tubular shaft 42 may have a similar brake device 50 for effecting the same result with system 47.

If the shafts are otherwise unconnected and are free to rotate with the systems as a result of the aerodynamic reaction of both systems but in opposite directions, it will be clear that the normal rolling moment of one system may just balance or cancel the rolling moment of the other system and thus preserve stability. It follows that application of either brake will retard the speed of rotation of the appropriate system in order to set up unbalance in the rolling moments of the two systems and thus to impart a rolling moment to the gyroplane.

It is preferred to couple the two shafts with a differential gearing whereby the slowing of one shaft marks an acceleration of the speed of the other. To this end the shaft 42 may be made longer than tubular shaft 45 and carry the bevel gear 51 in keyed or driving relation. Through intermediate bevel gear 52, the complementary bevel gear 53, carried by the ring gear 54, is in driving relation to gear 51, so as to cause shaft 42 to turn in the opposite direction to the tubular shaft 45. The latter carries bevel gear 55 of the differential gearing 56 operably associated with the ring gear 54. The power drive shaft 36, connected to the power source 41, including the pinion gear 35, and the interposed series of clutches are the same as discussed relative to Fig. 5.

The operation of the device of Figs. 6 and 7, is substantially similar to that already described in connection with the other forms of the invention, and need not be repeated.

I claim:

In aircraft of the gyroplane type, a fuselage having a longitudinal axis, a pair of rotating wing systems having each a rolling moment relative to said axis but so disposed that the rolling moments are equal and opposite so that they mutually cancel each other, and differential gearing means for coupling said systems for synchronous rotation, power means, and a centrifugal clutch between the power means and said systems effective to preclude driving engagement of the power means and systems when the power means speed is high.

EDWARD BURKE WILFORD.